(12) United States Patent
Lindsay et al.

(10) Patent No.: US 6,183,849 B1
(45) Date of Patent: Feb. 6, 2001

(54) METHOD FOR MANUFACTURING COMPOSITE BOARD USING HIGH OIL CONTENT WAX AND THE COMPOSITE BOARD MADE USING HIGH OIL CONTENT WAX

(75) Inventors: Alan R. Lindsay, Courtright; John A. Ciruna, Toronto, both of (CA)

(73) Assignee: Exxon Research and Engineering Company, Florham Park, NJ (US)

( * ) Notice: Under 35 U.S.C. 154(b), the term of this patent shall be extended for 0 days.

(21) Appl. No.: 09/397,794

(22) Filed: Sep. 17, 1999

(51) Int. Cl.[7] ............................. B32B 21/02; C08J 89/06
(52) U.S. Cl. ..................... 428/292.4; 524/13; 524/277; 524/541; 524/542; 428/287.4; 428/304.4; 428/308.8; 428/326; 428/327; 428/484; 428/485; 428/541
(58) Field of Search ............................. 524/13, 277, 541, 524/542; 428/292.4, 297.4, 304.4, 308.8, 326, 327, 484, 485, 541

(56) References Cited

U.S. PATENT DOCUMENTS

| | | | |
|---|---|---|---|
| 3,297,603 | 1/1967 | Mase | 260/17.3 |
| 3,340,204 | 9/1967 | MacLeod et al. | 252/311.5 |
| 3,360,462 | 12/1967 | Littler | 260/17.2 |
| 4,404,252 | 9/1983 | Hetzler et al. | 428/326 |

FOREIGN PATENT DOCUMENTS

| | | |
|---|---|---|
| 1794428 | 10/1979 | (DE) . |
| 19521699 | 12/1996 | (DE) . |
| 1367902 | 9/1974 | (GB) . |
| 2092165 | 8/1982 | (GB) . |
| 90033063 | 7/1990 | (JP) . |
| 10115026 | 5/1998 | (JP) . |
| 971854 | 11/1982 | (SU) . |
| 988844 | 3/1983 | (SU) . |
| 1484730 | 6/1989 | (SU) . |
| 1613333 | 12/1990 | (SU) . |
| 1819769 | 6/1993 | (SU) . |
| WO 98/00464 | 1/1998 | (WO) . |

OTHER PUBLICATIONS

"The Effect of Wax Type and Content on Waferboard Properties", Hsu, Melanson, Kozak, International Particleboard/Composite Materials Symposium, Apr. 3–5, 1990, pp. 85–93.

*Primary Examiner*—Samuel A. Acquah
(74) *Attorney, Agent, or Firm*—Joseph J. Allocca

(57) ABSTRACT

A quality composite board can be manufactured by combining natural fibrous material, resin and a waxy hydrocarbonaceous material wherein the waxy hydrocarbonaceous material is a natural, synthetic or petroleum wax containing from greater than 30 wt % to up to 98 wt % oil content.

9 Claims, No Drawings

METHOD FOR MANUFACTURING COMPOSITE BOARD USING HIGH OIL CONTENT WAX AND THE COMPOSITE BOARD MADE USING HIGH OIL CONTENT WAX

BACKGROUND OF THE INVENTION

1. Field of the Invention

The present invention relates to manufactured composite board products wherein the composite board product is a compressed, heat treated mixture of natural fibrous material, resin and wax.

2. Related Art

Manufactured composite board products, typically wafer board, hard board, oriented strand board, particle board, medium density fiberboard, etc., have been produced for many years and their method of manufacture is well known in the industry.

Typically such board products are produced by using a natural fibrous material as the primary component which is then sprayed, dipped or otherwise combined with a minor amount of resin and slack wax, formed into sheets and subjected to pressure and heat to yield finished, thin, generally stiff sheets of manufactured board materials.

U.S. Pat. No. 4,404,252 describes a surface stabilized waferboard having at least one surface rendered water resistant and stabilized against water loss.

In the process of that patent a wafer board is produced by bonding together wood wafers, adhesive resin and wax in a hot press, the water resistance and surface stabilization of at least one surface being accomplished by bonding a layer of porous paper to at least one surface of the wafer board while the wood wafers are being bonded together in the hot press. The wax employed in producing the wafer board is an aliphatic petroleum product referred to generally as a slack wax and is used in an amount in the range of 1 to 2 wt % of the wafer board, based on the oven dry weight of the wafer board.

While not so recited in the literature the slack wax generally used in the production of manufactured wafer or fiber board is typically 30 grade slack wax (550 N) which typically has an oil content in the range 18–28 wt %, more usually 18–21 wt % oil. A 10 grade slack wax (150 N) has also been used and it has a typical oil content in the range 12–28 wt %, more usually 14–21 wt %.

"The Effect of Wax Type and Content on Waferboard Properties" Hsu, et al, International Particleboard/Composite Materials Symposium, 1990, pp. 85–93, discusses and addresses the effect of wax content and oil content in wax on the physical properties of waferboard. The paper addresses waferboard swelling in response to from zero to 4.5% wax content as well as waferboard swelling and internal bond strength in response to from 0 to 30 wt % oil content in the wax used in the production of the waferboard.

DESCRIPTION OF THE INVENTION

The present invention is a manufactured board product comprising natural fibrous material, resin and a hydrocarbonaceous material comprising one or more natural, synthetic or petroleum waxy material containing from more than 30 wt % oil to up to 98 wt % oil. The present invention also relates to an improved method for producing a manufactured board product comprising combining natural fiber material, resin and oily hydrocarbonaceous material, forming the mixture into a layer and subjecting the layer to heat and pressure, the improvement comprising using as the oil hydrocarbonaceous material a natural, synthetic or petroleum wax containing greater than 30 wt % to up to 98 wt % oil.

DETAILED DESCRIPTION OF THE INVENTION

Manufactured composite board products are described comprising natural fibrous material, resin and an oily hydrocarbonaceous material comprising any natural, synthetic, or petroleum wax containing greater than 30 wt % up to 98 wt % oil.

Natural fibrous material, preferably porous material, includes wood chips, wafers, saw dust, wood fibers, cotton or other plant fibers, straw, bamboo cellulose, paper, acetate, etc. The fibrous material generally constitute about 90% to 98% of the final board product.

Resins used in the production of manufactured board materials are well known to those skilled in the production of manufactured board products.

Representatives of such resins are synthetic thermosetting resins produced by the poly condensation of formaldehyde or a formaldehyde donor with other suitable compounds. Examples of suitable adhesive resins include phenol formaldehyde, urea formaldehyde and melamine formaldehyde resins. Phenol formaldehyde resins are typically the condensation products of a phenol compound, e.g., an arythytroxide such as phenol, cresols, xylenols or resorcinol with a formaldehyde or a formaldehyde donor compound such as paraformaldehyde or methylene tetramine.

Other adhesives have been or are being considered for use or are in use in the production of manufactured board products and include tannins, isocyanates, sulfite liquor and admixtures of kraft tannins or sulfite liquor and phenol formaldehyde resins. Other resins can be used at the discretion and choice of the practitioner to satisfy his compositional or economic requirement.

The above is presented solely as non-limiting examples. Other adhesive resins common in the manufactured board product industry may also be used without limitation and the choice of the adhesive resin is left of the practitioner's particular needs or preferences.

The waxy hydrocarbonaceous material comprises one or more natural, synthetic or petroleum waxes containing greater than 30 wt/o to up to 98 wt % oil, preferably about 35 wt % to 95 wt % oil, more preferably about 40 wt % to 90 wt % oil, most preferably about 40 wt % to 85 wt % oil.

Natural waxes include bees wax, scale insect waxes, animal waxes, such as woolwax, spermaceti, marine oil waxes, plant waxes such as palm tree waxes, candelilla wax, retamo wax, flax wax, cotton wax, lemp wax, sugarcane wax, esparto wax, sorghum-grain wax, ricebran wax, leaf blade wax, root wax, cranberry wax, fruit cuticle waxes, vegetable waxes, etc., as well as fossil waxes such as monton wax, ceresin, peat wax, alpco wax, paraffin wax from shale oils or brown coal.

Synthetic waxes include waxes made by Fisher-Tropsch process from synthesis gas. Other synthetic waxes include polyethylene wax, ethylene copolymer wax, carbo waxes.

Petroleum waxes include waxes recovered by, e.g., the solvent dewaxing of waxy hydrocarbon oil streams as part of the petroleum refinery process including slack waxes and also includes hydrocracked waxes. Other petroleum waxes include waxy petroleum stocks such as waxy distillates, raffinates, petrolatum, microcrystalline waxes, etc.

These waxes can be used individually or as mixtures of waxes and in combination with one or more grades of oil. The waxy hydrocarbonaceous material used in the present invention is marked by an oil content higher than that commonly accepted in the manufactured composite board product industry as associated with the term "slack wax".

Whereas the "slack waxes" traditionally used have had an oil content in the 12–28 wt %, more usually 14–21 wt % range for 10 grade slack wax and in the 18–28 wt %, more usually 18–21 wt % range for 30 grade slack wax, the waxy hydrocarbonaceous material used in the present invention has an oil content of more than 30 wt % and up to 98 wt %, as previously recited.

The oil can be any natural or synthetic oil including the oil inherently present in a waxy oil stream as a result of adjusting the severity of any dewaxing or deoiling process practiced, and can include one or more deliberately added oil fractions derived from such sources as petroleum oils, e.g., naphthenic and paraffinic oils, tar sand oils, shale oils, coal oils, oils produced via Fischer-Tropsch processes, isomerized oil, isomerized wax oil, hydrocracked oil, as well as such natural oils as those derived from plant and animal sources such as corn oil, palm oil, peanut oil, olive oil, cotton seed oil, soy oil, whale oil, fish oil, tallow oil, etc.

The recited oil content can be achieved by adding one or more waxes to one or a mixture of a dewaxed or low wax content oil as or by adding one or more oils to one or a mixture of low oil content work. For example, in the case of slack waxes a useful waxy hydrocarbonaceous material can be obtained by not deoiling the slack wax as vigorously or extensively as hereto for has been normally practiced. Alternatively, oil can be added in an appropriate amount to wax to achieve the desired oil content. Conversely wax can be added in an appropriate amount to wax free or low wax content oil to achieve a blended product having an oil content in the recited range. Waxy hydrocarbonaceous material useful in the present invention can also include waxy liquid hydrocarbon streams per se such as waxy raffinate recovered from the solvent extraction of aromatic hydrocarbons from petroleum distillate fractions, as well as waxy distillates themselves the desired oil content being obtained by controlling the extent of any dewaxing step.

The wax and oil can be of the same or different grades. Thus, using slack wax as an example, a slack wax of any suitable grade with an oil content of about 18 wt % can have admixed with it from at least 12 wt % to 70 wt % grade 10 to bright stock oil. Thus, a 10 grade slack wax can be combined with a grade 10 to bright stock grade oil, or mixture of oils. The same holds true for natural and synthetic waxes. Any such wax or mixture of such waxes can be combined with any grade oil to produce the waxy hydrocarbonaceous material containing more than 30 wt % to up to 98 wt % oil.

Conversely a wax raffinate can be similarly employed provide the oil content is more than 30% oil.

Wax content and oil content are as determined at 20° C. (ASTM 3235). Thus, if at 20° C. a material has no visible or recoverable solid wax, for the purposes of this specification it is of zero wax content.

As envisioned herein, the oil can be present with or added to the wax as such or can contain minor amounts of additives which do not interfere with the production of the manufactured board products. Thus, the waxy hydrocarbonaceous material, being a mixture of wax and oil, can contain minor amounts of, for example anti-oxidants, antiwear materials, detergents, dispersants, pour point dispersants, corrosion inhibitors, dyes, fungicides, insecticides, etc. Such additives can be added to the waxy hydrocarbonaceous material, or can be present in or added to the separate oil fraction which is added to the wax to bring the oil content into the recited range.

It has been discovered that manufactured composite board product made using the waxy hydrocarbonaceous material as defined herein at least meets, and with respect to some measurement criterion exceeds, the swell and water absorption performance characteristics of board product made using the traditional slack wax of 18–28 wt % oil content.

Experimental

Typical 30 grade slack waxes were blended with an additional 40 and 70 vol % of a 30 grade base oil. Data from these blends were carefully compared to the typical result using the straight 30 grade wax (oil content of about 22 vol %) in the production of manufactured composite board product. Initial results demonstrate superior thickness swell and water absorption properties with the use of the high oil content waxy hydrocarbonaceous material, Table 1. The manufactured boards of Table 1 were made using phenol formaldehyde powder resin on both the faces and in the core of the boards.

Additional examples were run to evaluate high oil content wax in the production of manufactured board material using different adhesive system. In the examples of Table 2, MDI (a polymeric diphenylmethyl dissocyanate) was used in the core and liquid phenol formaldehyde (typically consisting of approximately 50% water) was applied to the face of the manufactured boards.

The results in Table 2 show that regardless of the adhesive system employed, the use of the high oil content wax results in the production of manufactured board material at least equivalent in quality to board manufactured using conventional slack wax.

TABLE 1

|   | Thickness Swell (24 hours) | Edge Swell (24 hours) | $H_2O$ Absorption (24 hours) |
|---|---|---|---|
| 1. reference wax (30 grade slack wax) (~22 vol % oil) dosage: 1%/1% face/core application | 17.5 | 31.0 | 31.0 |
| 2. reference wax + 40% more 30 grade oil (~53 vol % oil) dosage: 1%/1% face/core application | 17.2 | 30.3 | 27.9 |
| 3. reference wax + 70% more 30 grade oil (~77 vol % oil) dosage: 1%/1% face/core application | 16.9 | 30.9 | 30.1 |

Data from 2 and 3 produce data similar or better than 1 (which represents typical industry standard).

TABLE 2

HIGH OIL CONTENT WAX DATA

| Exp. # | Composition | Total Oil Vol % | Total Oil Wt % | % Wax Face/Core | Internal Bond psi | Thickness Swell 2 hr. % | Thickness Swell 24 hr. % | Edge Swell 2 hr. % | Edge Swell 24 hr. % | Water Absorption 2 hr. % | Water Absorption 24 hr. % | Comments |
|---|---|---|---|---|---|---|---|---|---|---|---|---|
| | The following data provides comparison of conventional 30 grade slack wax vs. conventional slack wax with increased oil content |
| 1 | 30 grade slack wax | 22 | 17.6 | 1.0/1.0 | 65.8 | 5.0 | 14.9 | 10.0 | 27.1 | 10.3 | 26.9 | reference (base case) wax with MDI core |
| 2 | 30 grade slack wax | 22 | 17.6 | 2.0/2.0 | 54.4 | 4.9 | 12.9 | 8.5 | 22.6 | 9.7 | 23.5 | reference (base case) wax with MDI core |
| 3 | 60% 30 grade slack wax + 40% 30 grade oil | 53 | 42.4 | 1.0/1.0 | 78.5 | 4.4 | 13.7 | 9.3 | 24.6 | 10.5 | 28.3 | confirmation testing |
| 4 | 60% 30 grade slack wax + 40% 30 grade oil | 53 | 42.4 | 2.0/2.0 | 60.4 | 4.5 | 13.2 | 7.4 | 23.2 | 8.8 | 24.2 | confirmation testing |
| 5 | 30% 30 grade slack wax + 70% 30 grade oil | 77 | 61.6 | 1.0/1.0 | 65.0 | 5.5 | 16.9 | 11.7 | 29.6 | 11.8 | 31.7 | confirmation testing |
| 6 | 30% 30 grade slack wax + 70% 30 grade oil | 77 | 61.6 | 2.0/2.0 | 54.5 | 4.5 | 13.6 | 8.2 | 24.9 | 9.6 | 26.4 | confirmation testing |
| 7 | 10% 30 grade slack wax + 90% 30 grade oil | 92 | 73.6 | 1.0/1.0 | 68.3 | 6.7 | 22.5 | 14.1 | 31.1 | 15.1 | 42.7 | determine high level of blend |
| 8 | 100% 30 grade oil | 100 | 100 | 1.0/1.0 | 66.3 | 16.7 | 39.6 | 27.9 | 39.5 | 34.7 | 91.1 | 100% oil at different dosages |
| 9 | 100% 30 grade oil | 100 | 100 | 2.0/2.0 | 56.8 | 26.6 | 41.8 | 34.6 | 42.8 | 56.7 | 94.3 | 100% oil at different dosages |
| 10 | 100% 30 grade oil | 100 | 100 | 4.0/4.0 | 55.6 | 24.6 | 39.2 | 32.2 | 38.9 | 51.6 | 92.6 | 100% oil at different dosages |

Most comparisons are done with the 1.0/1.0 dosage which is typical of industry.
Higher dosages were studied to assess any potential benefits.
Significance of "% number" for Thickness Swell, Edge Swell and Water Absorption: a variation of greater than "2%" indicates a difference.
Based on comparison of Face/Core dosages, an increase to 2.0/2.0 with a total oil volume of 92%, may generate data equal to Exp. #1.
Wt % Total Oil - calculated by converting Vol % Total Oil by 0.8 (typical wax/oil density).

Experiments 11 through 14 demonstrates the potential of varying wax and oil grades

| Exp. # | Composition | Total Oil Vol % | Total Oil Wt % | % Wax Face/Core | Internal Bond psi | 2 hr. % | 24 hr. % | 2 hr. % | 24 hr. % | 2 hr. % | 24 hr. % | Comments |
|---|---|---|---|---|---|---|---|---|---|---|---|---|
| 11 | 60% 60 grade slack wax + 40% 30 grade oil | 53 | 42.4 | 1.0/1.0 | 57.7 | 6.7 | 20.2 | 13.6 | 32.6 | 14.3 | 36.8 | different oil/wax grades |
| 12 | 60% 60 grade slack wax + 40% 30 grade oil | 53 | 42.4 | 2.0/2.0 | 52.4 | 5.5 | 16.7 | 11.5 | 29.5 | 12.0 | 30.8 | different oil/wax grades |
| 13 | 60% 30 grade slack wax + 40% 60 grade oil | 53 | 42.4 | 1.0/1.0 | 59.5 | 5.2 | 16.9 | 12.2 | 31.2 | 10.9 | 29.5 | different oil/wax grades |
| 14 | 60% 30 grade slack wax + 40% 60 grade oil | 53 | 42.4 | 2.0/2.0 | 52.9 | 4.8 | 14.2 | 9.2 | 27.7 | 9.3 | 23.5 | different oil/wax grades |

Most comparisons are done with the 1.0/1.0 dosage which is typical of industry.
Higher dosages were studied to assess any potential benefits.
Significance of "% number" for Thickness Swell, Edge Swell and Water Absorption: a variation of greater than "2%" indicates a difference.
Wt % Total Oil - calculated by converting Vol % Total Oil by 0.8 (typical wax/oil density).

What is claimed is:

1. A manufactured composite board product comprising a major amount of a natural, porous fibrous material and a minor amount of an adhesive resin and a hydrocarbonaceous material wherein the hydrocarbonaceous material comprises wax having an oil content of greater than 30 wt % to up to 98 wt % oil.

2. The manufactured composite board product of claim 1 wherein the hydrocarbonaceous material comprises one or more natural, synthetic or petroleum wax having an oil content of about 35 wt % to up to 95 wt % oil.

3. The manufactured composite board product of claim 1 wherein the hydrocarbonaceous material comprises one or more natural, synthetic or petroleum wax having an oil content of about 40 wt % to up to 80 wt % oil.

4. The manufactured composite board product of claim 1, 2 or 3 wherein the hydrocarbonaceous material comprises petroleum wax having an oil content of greater than 30 wt % oil to up to 98 wt % oil.

5. The manufactured composite board product of claim 1, 2 or 3 wherein the hydrocarbonaceous material comprises a waxy raffinate having an oil content of greater than 30 wt % up to about 98 wt % oil.

6. In the method for producing manufactured composite board product comprising a major amount of a natural, porous fibrous material with a minor amount of an adhesive resin and a hydrocarbonaceous material, forming sheet and subjecting the sheet to heat and pressure to form a generally stiff sheet of board product, the improvement comprising using as the hydrocarbonaceous material wax having an oil content of greater than 30 wt % to up to about 98 wt % oil.

7. In the method of claim 6, the improvement comprising using as the hydrocarbonaceous material one or more natural, synthetic or petroleum waxes having an oil content of about 35 wt % to about 95 wt % oil.

8. In the method of claim 6 the improvement comprising using as the hydrocarbonaceous material one or more natural, synthetic or petroleum wax having an oil content of about 40 wt % to about 80 wt % oil.

9. In the method of claim 6, 7 or 8, the improvement comprising using as the hydrocarbonaceous material a petroleum wax having an oil content of greater than 30 wt % up to 98 wt % oil.

* * * * *